United States Patent [19]

DeGrace et al.

[11] Patent Number: 4,991,557
[45] Date of Patent: Feb. 12, 1991

[54] SELF-ATTACHING ELECTROMAGNETIC FUEL INJECTOR

[75] Inventors: Louis G. DeGrace, Newport News; James A. Wynn, Jr., Virginia Beach, both of Va.

[73] Assignee: Siemens-Bendix Automotive Electronics L.P., Troy, Mich.

[21] Appl. No.: 396,592

[22] Filed: Aug. 21, 1989

[51] Int. Cl.⁵ .................. F02M 39/00; B05B 1/14
[52] U.S. Cl. .................. 123/470; 123/468; 239/550; 239/600
[58] Field of Search ........... 123/470, 456, 471, 472, 123/468, 469; 239/600, 596, 550, 551, 554, 566; 285/305

[56] References Cited

U.S. PATENT DOCUMENTS

| | | | |
|---|---|---|---|
| 4,240,384 | 12/1980 | Urainati | 123/470 |
| 4,294,215 | 10/1981 | Hans | 239/600 |
| 4,307,693 | 12/1981 | Glockler | 123/470 |
| 4,474,159 | 10/1984 | Katnik | 239/600 |
| 4,474,160 | 10/1984 | Gartner | 123/470 |
| 4,475,516 | 10/1984 | Atkins | 123/470 |
| 4,539,961 | 9/1985 | Atkins | 123/469 |
| 4,570,601 | 2/1986 | Ito | 239/550 |
| 4,570,602 | 2/1986 | Atkins | 123/468 |
| 4,586,477 | 5/1986 | Fields | 123/468 |
| 4,693,223 | 9/1987 | Eshleman | 123/470 |
| 4,823,754 | 4/1989 | Minamoto | 123/470 |
| 4,899,712 | 2/1990 | DeBruyn | 123/468 |
| 4,909,221 | 3/1990 | Heyser | 123/470 |
| 4,915,305 | 4/1990 | O'Brien | 239/550 |

Primary Examiner—Carl Stuart Miller
Attorney, Agent, or Firm—George L. Boller; Russel C. Wells

[57] ABSTRACT

An electromagnetic fuel injector has an attaching clip that is integrally formed with the non-metallic electrical insulating material that is molded to surround the electrical terminals of the injector solenoid. The clip is resiliently pivotable on the injector body for releasable engagement with a fuel rail cup when the injector is inserted into the cup. Several versions of clips are illustrated. The invention eliminates the need for a separate metal attaching clip.

10 Claims, 2 Drawing Sheets

SELF-ATTACHING ELECTROMAGNETIC FUEL INJECTOR

BACKGROUND AND SUMMARY OF THE INVENTION

This invention relates to electromagnetic operated fuel injectors of the type used in fuel injection systems of internal combustion engines. More specifically, the invention relates to a new and improved means for attaching such a fuel injector to the portion of the fuel injection system that supplies fuel to the injector.

A commonly used means of attachment of a top-feed fuel injector to the fuel rail supplying the injector with liquid fuel involves the use of a separate metal attaching clip. Attachment is accomplished by inserting the fuel injector into a connector, or cup, that is part of the fuel rail, and then assembling the clip to secure the injector to the connector. Each clip is a separate part, and therefore elimination of the clips will reduce the number of parts required in the assembly of a fuel injection system. Such clips can also be a source of mechanical interference with the electrical connectors that make connection to the electrical terminals of the fuel injectors.

The present invention relates to a novel means for providing self-attachment of a fuel injector to a fuel rail in a way which eliminates the use of separate metal attaching clips. Self-attachment is accomplished by means of a non-metallic attaching clip that is formed integrally with the electric insulating material that is molded onto the injector body to provide insulation around the electrical terminals of the injector. In addition to the advantages of reducing the number of parts in a fuel injection system, the invention can prevent the occurrence of mechanical interference of the clips with the electrical connectors that connect to the electrical terminals of the injectors. A further attribute of the invention is that proper alignment of an injector to a fuel rail cup can be inherently attained with assembly of the injector to the cup.

Further features, advantages, and benefits of the invention, along with those already mentioned, will be seen in the ensuing description and claims which are accompanied by drawings. The drawings disclose a presently preferred embodiment of the invention according to the best mode contemplated at this time for carrying out the invention.

DESCRIPTION OF THE PREFERRED EMBODIMENT

Figure 1:
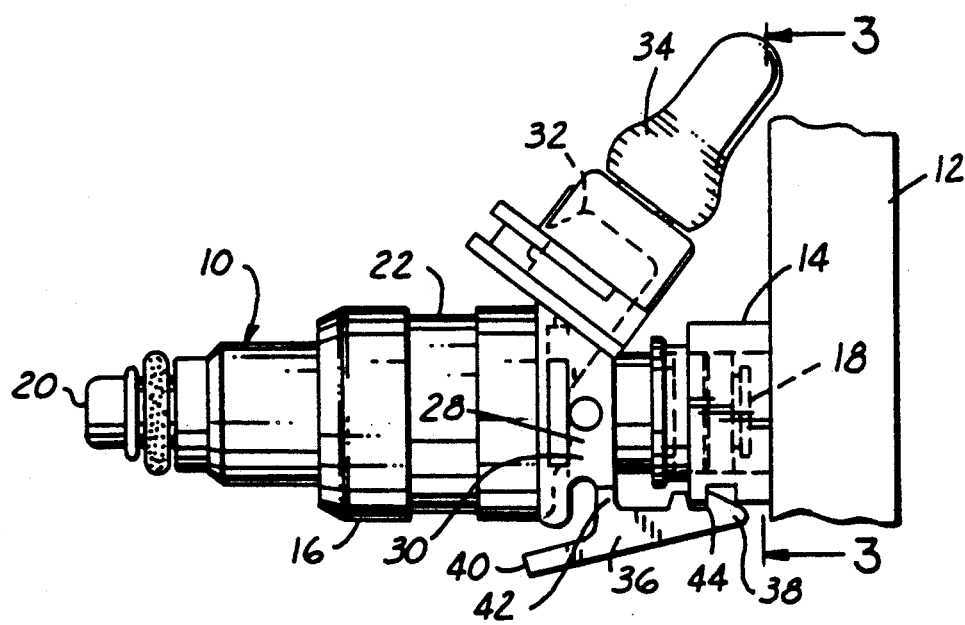
FIG. 1 is a plan view of a fuel injector assembled to a fuel rail by means of the novel attaching clip made in accordance with principles of the invention.

FIG. 1 shows an example of a fuel injector 10 containing the present invention and attached to a fuel rail 12. The fuel rail contains a cup 14 into which one end of the injector body 16 is inserted. This end of the injector contains a fuel inlet 18 while the opposite end contains a fuel outlet 20. Within the injector body is a solenoid 22 that operates the internal injector mechanism to control fuel flow through the injector between inlet 18 and outlet 20. Solenoid 22 is energized from a remotely located electronic control unit (not shown) via a pair of electrical terminals 24, 26 (FIG. 3) that are on the injector.

Electrical insulating material 28 is formed onto the injector body to provide a body-engaging portion 30 and a terminal-surrounding portion 32. These two portions are an integral formation on the exterior of the injector body. Terminal-surrounding portion 32 cooperates with terminals 24, 26 to form an electrical connector that separably connects to a mating connector 34 (FIG. 1) from the electronic control unit.

Figure 2:
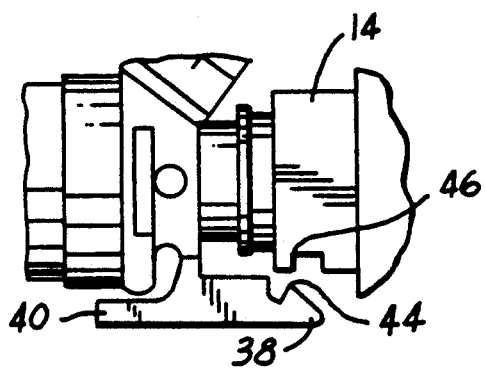
FIG. 2 is a fragmentary view of a portion of FIG. 1 illustrating an alternate position of the attaching clip that is assumed during removal of the fuel injector from the fuel rail.

In accordance with principles of the invention, an attaching clip 36 is formed of electrical insulating material as an integral formation with the integrally formed portions 30, 32. Clip 36 has an elongate shape comprising a distal end 38 that is toward cup 14 and a proximal end 40 that is opposite distal end 38. The integral joining of the clip to the body-engaging portion 30 is by means of a web 42 of insulating material that constitutes a hinge-like portion enabling the clip to pivot between the positions depicted by FIGS. 1 and 2. The distal end of the clip is formed with a catch 44 that releasably latches with a complementary shaped catch 46 formed in cup 14 as shown by FIG. 1. When the clip is pivoted to the position of FIG. 2, catch 44 disengages catch 46 to break the attachment so that the injector can be disconnected from the fuel rail by extracting it axially out of cup 14. Pivoting of the clip from the position of FIG. 1 to the position of FIG. 2 can be accomplished by pressing the proximal end 40 of the clip toward the injector body so that the distal end 38 moves laterally outwardly. Reattachment of the injector to the cup can be accomplished by aligning the injector with the cup and inserting the end of the injector into the cup. As the injector is being reinserted into the cup, the tapered leading edge of the clip's catch will abut the wall of the cup causing the clip to be cammed in the clockwise sense, as viewed in FIG. 1, until the two catches 44, 46 come into registry at which time the resiliency of the hinge-like web portion 42 will cause the clip to pivot counter-clockwise and engage the two catches, thereby completing the self-attachment of the injector to the cup. Alternatively, the clip could be held in the position of FIG. 2 during reinsertion of the injector into the cup, and then released once the two catches 44, 46 are in registry.

The process for fabricating the clip involves using an injection mold cavity of suitable design so that the clip 36 and hinge-like web 42 are molded integrally with the body-engaging portion 30 and the terminal-surrounding portion 32 in a single operation. This provides the most efficient procedure and the best resulting construction. By molding the clip to be diametrically opposite the electrical terminals 24, 26, the potential for mechanical interference between the clip and connector 34 is eliminated. A number of materials are suitable for the insulating material 28, for example type 6 nylon, type 6—6 nylon, type 12 nylon, with or without glass, or any other material that will provide suitable resilient hinging action for the clip in the environment of an automotive engine containing a fuel injection system.

A further advantage of the invention is that proper circumferential alignment of the injector with the cup can be assured. By providing the cup catch 46 at a particular circumferential orientation, the injector must be placed in the proper circumferential orientation to assure that the clip will engage the cup catch upon insertion into the cup. Proper circumferential orientation is important where the injector is of the split stream type.

Figure 3:
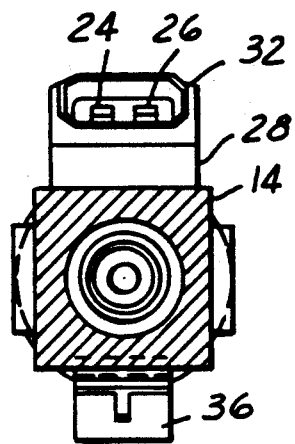
FIG. 3 is a transverse cross sectional view taken in the direction of arrows 3—3 in FIG. 1.
Figure 4:
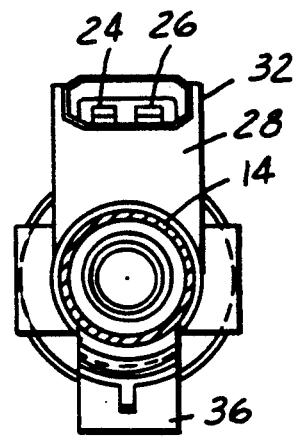
FIG. 4 is a view similar to FIG. 3 showing a modified form.
Figure 5:
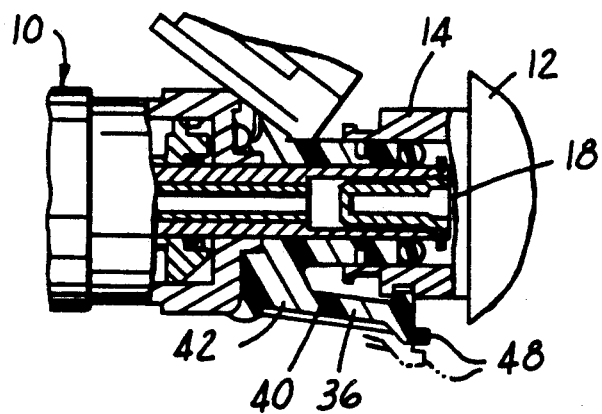
FIG. 5 is a fragmentary view partly in cross section illustrating an alternate embodiment.
Figure 6:
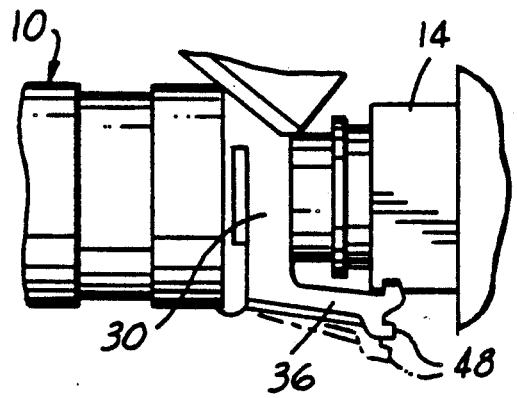
FIGS. 6, 7, and 8 are fragmentary views of still further embodiments.
Figure 7:
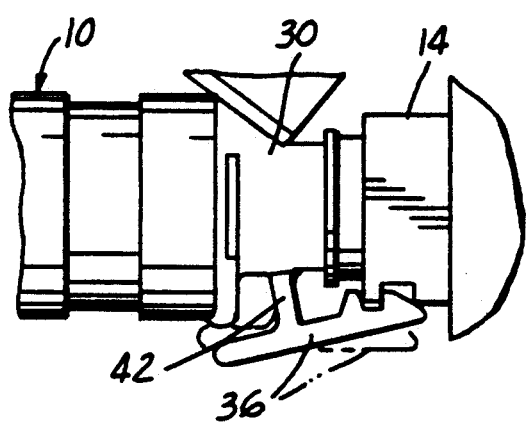
Figure 8:
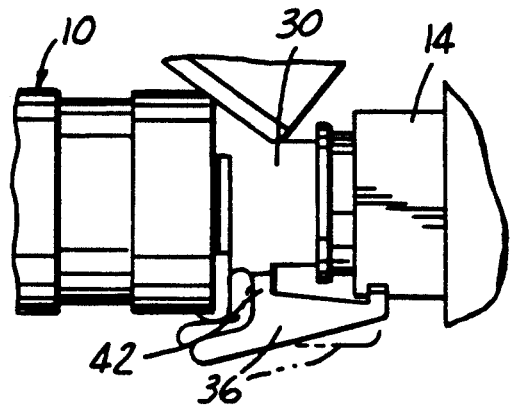

FIGS. 3 and 4 portray two types of cups 14, non-circular and circular respectively, and the clip can be designed for either type.

FIGS. 5-8 present additional embodiments of clips 36. The clips of FIGS. 5 and 6 each has the web 42 at the proximal end 40 of the clip whereas the clips of FIGS. 7 and 8, like the clip of FIG. 1 have their webs intermediate their proximal and distal ends. The clips of FIGS. 5 and 6 also have lips 48 at their distal ends via which the clips can be pivoted.

While a preferred embodiment of the invention has been illustrated and described, it should be understood that principles of the invention may be embodied in other ways.

What is claimed is:

1. In an electromagnetic fuel injector comprising a body, a liquid fuel inlet in said body at which pressurized fuel is introduced to the injector, a flow path from said inlet through said body leading to a fuel outlet at which fuel is emitted from the injector, a solenoid coil that controls the flow of fuel through said flow path, electrical terminal means via which said solenoid coil is energized, and electrical insulating material disposed on said body to form a body-engaging portion and a terminal-means-surrounding portion, the improvement for rendering the injector self-attaching which comprises an attaching clip of said electrical insulating material that is integral with said body-engaging and said terminal-means-surrounding portions and that is resiliently pivotally supported on said body-engaging portion, said clip providing for the self-retention of the fuel injector on a portion of the fuel injection system that supplies fuel to the injector.

2. The improvement set forth in claim 1 in which said clip is diametrically opposite said terminal-means-surrounding portion.

3. The improvement set forth in claim 1 in which said clip is resiliently pivotally supported on said body-engaging portion at a location intermediate proximal and distal ends of said clip.

4. The improvement set forth in claim 1 in which said clip is resiliently pivotally supported on said body-engaging portion at a proximal end of said clip.

5. In an electromagnetic fuel injector comprising a body, a liquid fuel inlet at one axial end of said body at which pressurized fuel is introduced to the injector, a flow path from said inlet through said body leading to a fuel outlet at which fuel is emitted from the injector, a solenoid coil that controls the flow of fuel through said flow path, electrical terminal means via which said solenoid coil is energized, the improvement for rendering the injector self-attaching to a fuel rail cup into which said one end of said injector is to be inserted, said improvement comprising a non-metallic clip having proximal and distal ends arranged so that said distal end is adapted to releasably engage the cup into which said one end of the injector is inserted, a non-metallic body-engaging portion engaging the injector body, and a non-metallic web integrally joining said clip and said body-engaging portion such that said clip can resiliently pivot about said web to laterally displace the distal end of said clip and thereby enable the distal end of said clip to release and engage the cup into which said one end of the injector is inserted.

6. The improvement set forth in claim 5 in which a non-metallic terminal-means-surrounding portion surrounds said terminal means, said non-metallic terminal-means-surrounding portion being integral with said non-metallic body-engaging portion.

7. The improvement set forth in claim 5 in which said web joins the proximal end of said clip with said body-engaging portion.

8. The improvement set forth in claim 5 in which said web joins said body-engaging portion with said clip at a location on said clip that is between the proximal and distal ends of the clip.

9. In a fuel rail having a cup to which an electromagnetic fuel injector is attached in a generally coaxial manner, the improvement in the attachment of the fuel injector to the cup which comprises a self-attaching clip that is integral with one of said cup and said injector, that is at a particular circumferential orientation on said one of said cup and said injector, and that is resiliently pivotally supported on said one of said cup and said injector so as to normally assume a latching position but be able to be resiliently pivoted to a non-latching position, the other of said cup and said injector having a catch for said self-attaching clip, said catch being at a particular circumferential orientation, said self-attaching clip engaging said catch when the clip is in the latching position and the injector and the cup are properly circumferentially aligned with each other.

10. The improvement set forth in claim 9 in which said injector is of the split stream type so that when the self-attaching clip is engaged with said catch to properly circumferentially align the injector and cup, the streams of the injector are properly directed.

* * * * *